United States Patent [19]

Gran et al.

[11] Patent Number: 5,170,715
[45] Date of Patent: Dec. 15, 1992

[54] AEROMAGNETIC CONTROL OF MAGLEV VEHICLES WITH TURNTABLE MOUNTED HINGED CONTROL SURFACE HAVING TWO DEGREES OF MOTION

[75] Inventors: Richard J. Gran, Farmingdale; Michael Proise, Garden City, both of N.Y.

[73] Assignee: Grumman Aerospace Corporation, Bethpage, N.Y.

[21] Appl. No.: 763,523

[22] Filed: Sep. 23, 1991

[51] Int. Cl.5 .......................... B60L 13/06; B64F 3/00
[52] U.S. Cl. .................................... 104/284; 104/23.1
[58] Field of Search ...................... 104/282, 284, 23.1, 104/23.2

[56] References Cited

U.S. PATENT DOCUMENTS

| | | | |
|---|---|---|---|
| 1,437,183 | 11/1922 | Johnson | 104/23.1 X |
| 2,976,820 | 3/1961 | Schaa | 104/23.1 X |
| 3,721,198 | 3/1973 | Applegate | 104/23.1 |
| 3,768,417 | 10/1973 | Thornton et al. | 104/285 X |
| 3,871,301 | 3/1975 | Kolm et al. | 104/284 X |
| 4,299,173 | 11/1981 | Arima et al. | 104/284 |
| 4,356,772 | 11/1982 | van der Heide | 104/284 X |
| 4,703,697 | 11/1987 | Bell | 104/23.1 |
| 4,941,406 | 7/1990 | Lay | 104/23.1 |
| 4,969,401 | 11/1990 | Kolm | 104/284 |

Primary Examiner—Robert J. Oberleitner
Assistant Examiner—S. Joseph Morano
Attorney, Agent, or Firm—Pollock, VandeSande & Priddy

[57] ABSTRACT

Movable aerodynamic control surfaces are mounted to a MAGLEV vehicle. They operate in combination with magnetically actuated coils that are located in the vehicle and cooperate with coils or metallic sheets located along the vehicle guideway. Sensors provide clearance information concerning the vehicle relative to the guideway as well as translational speed and vehicle rotational measurements. Based on input from these sensors, a computer positions the control surfaces and energizes the magnetic coils so as to unload dynamic forces and stresses imposed by the vehicle while providing smoother vehicle movement indicative of superior passenger comfort.

1 Claim, 2 Drawing Sheets

AEROMAGNETIC CONTROL OF MAGLEV VEHICLES WITH TURNTABLE MOUNTED HINGED CONTROL SURFACE HAVING TWO DEGREES OF MOTION

FIELD OF THE INVENTION

The present invention relates to the use of control surfaces and controlled magnetic levitation means for jointly unloading dynamic forces and stresses imposed by MAGLEV vehicles while traveling at high speeds on a guideway.

BACKGROUND OF THE INVENTION

Magnetically levitated and propelled vehicles, commonly referred to as MAGLEV vehicles, have long promised rapid and comfortable transportation. Germany and Japan are currently experimenting with such systems and the improvement of superconducting coils brings further promise to the use of these types of mass transit vehicles over long distances throughout the world. The guideway of a MAGLEV vehicle must be designed to withstand dynamic deflections, in the vertical direction, which are 2.5 to 3 times the deflections experienced with the vehicle's static loads. Similarly, when the vehicle is traveling around curves, the guideway must take the side loads created by the centrifugal force, which can be half the weight of the vehicle. Any process that can minimize the amplitude of these dynamic loads will have a significant effect on the design stiffness and the corresponding cost of the guideway, for which a MAGLEV system represents its major cost consideration.

BRIEF DESCRIPTION OF THE PRESENT INVENTION

The central concept of the present invention is to combine aerodynamic control surfaces on the MAGLEV vehicle in conjunction with magnetic coils which interface with the guideway. Sensor means establish the displacement of a MAGLEV vehicle relative to its guideway and a computer acts in response to the sensors to generate control surface displacement and selective coil energization in a manner controlling roll, pitch, yaw, and heave of the vehicle. The control surfaces are deflected relative to an airstream in such a manner as to alleviate the dynamic loading on the guideway so as to provide required off-loading capability. The magnetic coils act against the guideway to provide passenger ride comfort.

The unique aspect of the present invention is the joint utilization of aerodynamic control surfaces and magnetic controls to minimize vertical and lateral loads on the guideway by minimizing the amplitude of dynamic loads thereon by the vehicle. At the same time the present invention provides a relatively vibration-free and level ride for passengers. Although adjustable control surfaces are employed extensively in aircraft for altering roll, pitch, yaw, and heave, and existing MAGLEV vehicles utilize magnetic coils for levitational control of the MAGLEV vehicles for providing passenger comfort, the combination of the two has not been previously developed for adding the distinctive advantage of guideway load alleviation.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
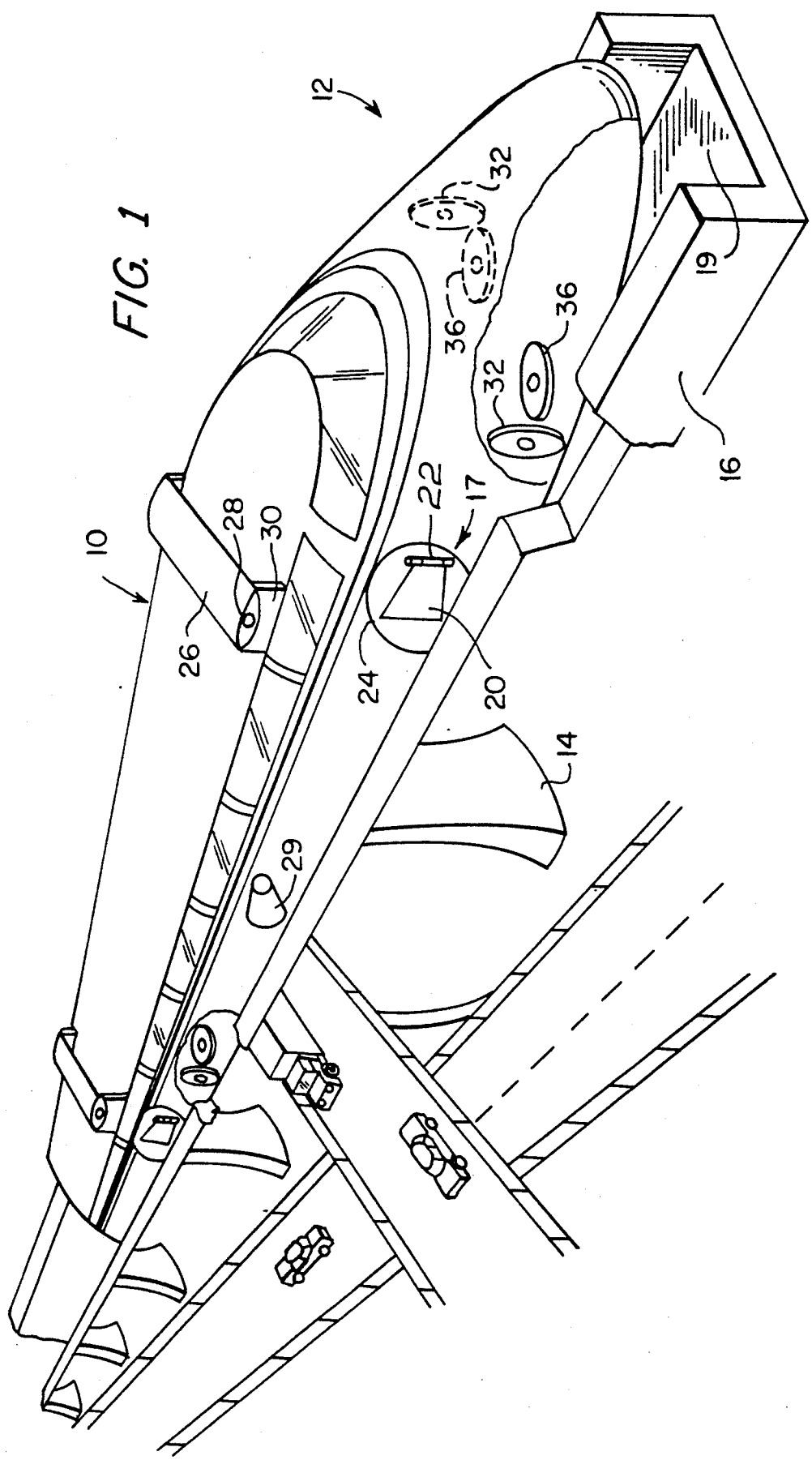
FIG. 1 is a diagrammatic illustration of a MAGLEV vehicle on an elevated guideway.

Referring to FIG. 1 a diagrammatic illustration of the present invention is indicated wherein a conventionally shaped MAGLEV vehicle 10 is seen to ride along an elevated guideway 12 which is suspended from columns 14 over an interstate roadway system. Of course, this environment is chosen for purposes of illustration and it must be noted that there is no necessary relationship between the MAGLEV system and the road system.

The guideway 12 is seen to include a channel configuration having opposite side walls 16 and a bottom 19.

Along the forward and rearward ends of the vehicle 10 movable control surfaces 17 are mounted on opposite lateral sides, although the control surfaces are only shown on the near lateral side in FIG. 1.

Each movable control surface 17 includes an aerodynamic control surface member 20 mounted on a hinge 22 thereby permitting pivotal rotation of the member 20. When traveling at relatively low speeds or when the vehicle approaches a station, the member 20 is rotated to a flush position relative to the vehicle side so as to reduce drag at low speeds or prevent damage due to contact by the side wall 16 of the guideway 12. The hinged member 20 is mounted on a turntable 24 so that the plane of the control member may be varied relative to the direction of vehicle travel.

Above the vehicle are two rotatably mounted control surface members generally indicated by reference numeral 26. End brackets 30 support the member 26 pivotally mounted on shaft 28. The face of member 26 is varied as is that of control member 20, relative to an encountered airstream so that the MAGLEV vehicle 10 may be subjected to lift thereby changing the dynamic deflections of the vehicle in the vertical direction upon the guideway.

An alternate approach to employing the control surface members 20 and 26 would be to use variably deflectable RAM air jets pointed in an appropriate direction to provide required guideway off-loading, as indicated by the movable jet nozzle 29. Although only one such nozzle is employed, it should be understood that four such nozzles could be mounted to replace the members 20 and additional units could be mounted on the top of vehicle 10 so as to replace control surface members 26.

FIG. 1 further illustrates the utilization of magnetic actuators in the form of coils positioned fore and aft of the vehicle 10. In the forward section of the vehicle, laterally displaced vertically oriented coils 32 are seen positioned in the interior lower floor section of the vehicle. Corresponding horizontal coils 36 are positioned against the vehicle floor.

Along the guideway are a number of interacting aluminum coils or sheets (not shown) which may be installed in the side walls 16 or bottom 19 of the guideway so as to provide additional selective control of vehicle clearance relative to the side walls and bottom of the guideway. The coils operate in a manner similar to that of the prior art. However, as will be appreciated, it is the combination of aerodynamic control surfaces and the magnetic coils which provide sufficient flexibility of unloading dynamic forces and stresses to minimize constructional problems and expense of the guideway at the same time that the vehicle itself may provide a comfortable ride for passengers.

Figure 2:
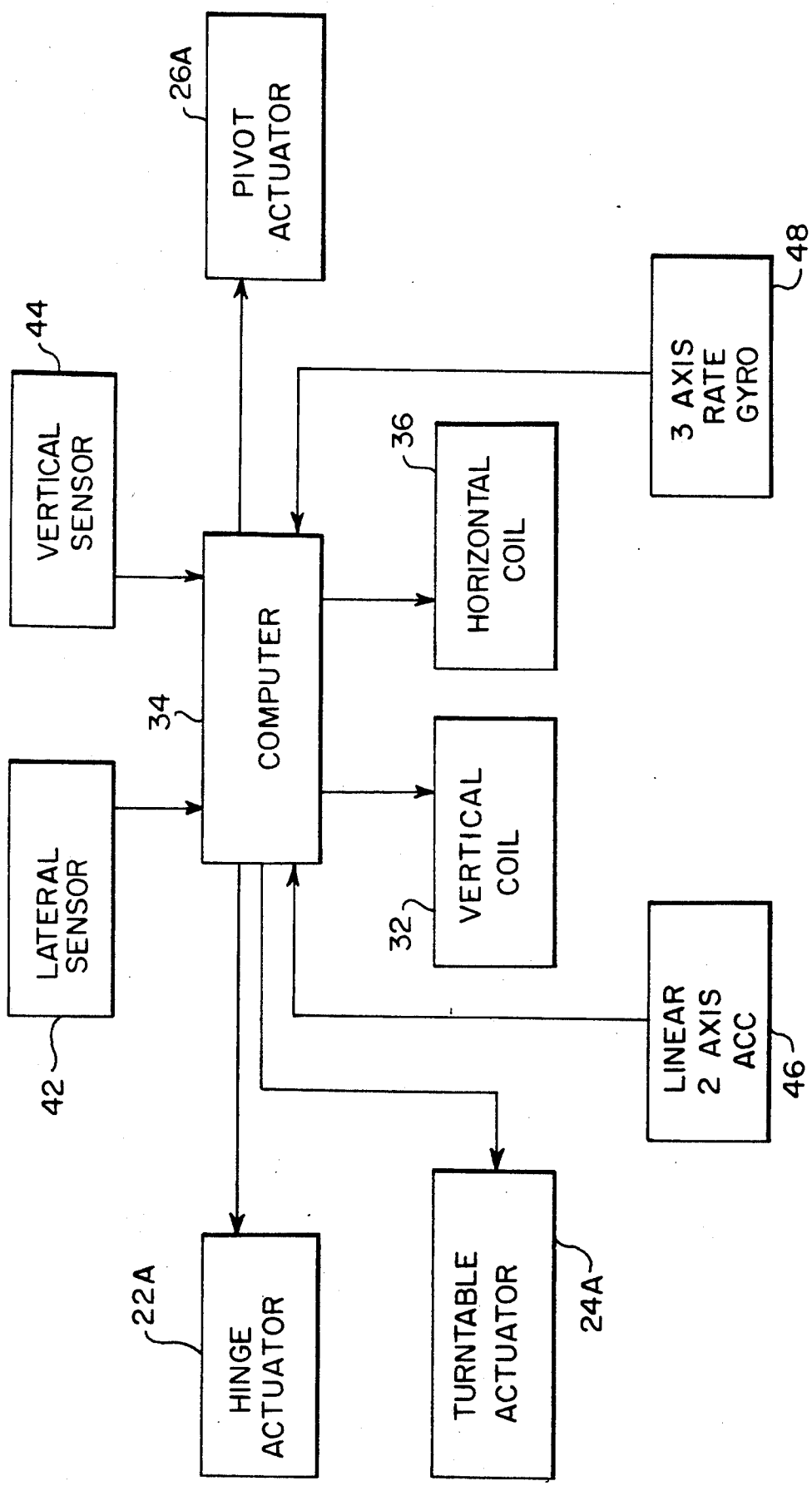
FIG. 2 is a block diagram of the electrical control system for the present invention.

FIG. 2 refers to a generalized block diagram of the electrical system for the present invention. Positional information concerning vehicle 10, relative to guideway 12, is provided by conventional range sensors serving as lateral displacement sensor 42 and vertical displacement sensor 44. Four sensors of each type would be located in vehicle 10, two forward and two aft. The lateral sensors provide information to a computer 34 so as to make side clearance measurements for the control of side motion and yaw motion relative to the guideway. The vertical sensors 44 would be downwardly facing and used to make heave, pitch, and roll measurements relative to the guideway.

In addition to the range sensors mentioned, a linear two-axis accelerometer 46 and a three-axis rate gyroscope 48, both of conventional design, are mounted on the vehicle and are used to measure the translational and rotational motions of the vehicle relative to inertial space. From clearance information derived from sensors 42 and 44 as well as translational and rotational motion measured by accelerometer 46 and gyro 48, computer 34 generates signals to hinge actuator 22A and turntable actuator 24A which position the control member 20 in a manner effecting a preselected amount of lift. Similarly, the computer 34 provides pivot actuator 26A with a sufficient control signal to rotate aerodynamic member 26 on its shaft 28 for a preselected amount of lift dependent upon the speed and positional information measured for vehicle location, relative to the guideway. It should be mentioned that positional information may also be furnished to computer 34 as to the location of columns 14 relative to the vehicle 10 as it passes from column to column. The imposition of lift forces on the vehicle as it passes between columns at particular rates of speed will result in a desired guideway dynamic load alleviation. The amount of required lift by the aerodynamic control surfaces is controlled by computer 34 in much the same manner "fly-by-wire" aircraft are controlled by on-board computers provided with sensor and navigational information.

In summary, the horizontal aerodynamic control surface members 20, mounted to the top of vehicle 10 with a single axis of rotation, are used to control heave and pitch. The four additional aerodynamic control surface members 20 located on the sides of the vehicle are used to achieve side-to-side control along with yaw and roll. Operation of hinge actuator 22A provides pivot displacement of member 20 thereby providing the forces required to minimize the side loads acting on the vehicle. Energization of turntable actuator 24A provides for rotation of the member 20 and is used to provide yaw and roll control.

It will be appreciated from the aforementioned description of the invention that the combination of aerodynamic control surfaces along with the magnetic coils carried by the vehicle offers the likely prospect of unloading dynamic forces and stresses imposed by a MAGLEV vehicle on its guideway simultaneous with providing maximum comfort to passengers. Enhanced operation is envisioned by the use of superconducting coils in the vehicle although conventional air core coils may be employed.

It should be understood that the invention is not limited to the exact details of construction shown and described herein for obvious modifications will occur to persons skilled in the art.

We claim:

1. A MAGLEV vehicle comprising:
   at least one wagon adapted to ride along a guideway;
   a first set of lift imparting control surfaces mounted in equidistant spaced relation to the top surface of the wagon, each being pivotally mounted to an axis parallel to the top of the wagon and disposed transversely to a longitudinal axis of the wagon;
   a plurality of turntables rotatably connected to sides of the wagon;
   a second set of lift imparting control surfaces mounted by hinges to respective turntables, the axis of rotation of each turntable being perpendicularly spaced from the axis of rotation of each hinge thereby allowing the second set of lift imparting control surfaces to undergo two degrees of movement;
   a set of vertically oriented coils at least at forward and rearward ends of the wagon; and
   a set of horizontally oriented coils located at least at the forward and rearward ends of the wagon;
   wherein the coils selectively magnetically react with the guideway for controllably providing clearance between the wagon and the guideway.

* * * * *

UNITED STATES PATENT AND TRADEMARK OFFICE
CERTIFICATE OF CORRECTION

PATENT NO. : 5,170,715

DATED : December 15, 1992

INVENTOR(S) : Richard J. Gran, et al.

It is certified that error appears in the above-identified patent and that said Letters Patent is hereby corrected as shown below:

Column 1, line 45, after "heave" insert --(vertical and lateral) motions--.

Column 1, line 60, after "vehicles" insert --may--.

Column 2, line 17, after "system." insert --Different shapes of guideways and vehicles can exist without effecting the claims of the invention.--.

Column 2, line 34, after "vehicle travel." insert --Other aerodynamic control surface configurations exist which can provide the same functional claims of this invention.--.

Column 3, after line 6, insert the following paragraph: --An alternate approach would utilize secondary suspension systems between the passenger cabin and the lower section of the vehicle containing the superconducting

UNITED STATES PATENT AND TRADEMARK OFFICE
CERTIFICATE OF CORRECTION

PATENT NO. : 5,170,715

DATED : December 15, 1992

INVENTOR(S) : Richard J. Gran, et al.

It is certified that error appears in the above-identified patent and that said Letters Patent is hereby corrected as shown below:

magnets. This could eliminate the need for magnetic actuators, since the suspension system would provide the ride comfort required for the passengers.--

Column 3, line 8, after "electrical" insert --control--.

Column 3, line 18, after "pitch," insert --yaw,--.

Column 3, line 27, after "48," insert --the--.

Column 4, line 18, after "core coils" insert --and iron cored coils--.

Signed and Sealed this

Twenty-sixth Day of October, 1993

Attest:

BRUCE LEHMAN

*Attesting Officer*     *Commissioner of Patents and Trademarks*